3,081,529
METHOD FOR MAKING ELECTRODES
Raymond E. Schwyn, Flint, and Karl Schwartzwalder, Holly, Mich., assignors to General Motors Corporation, Detroit, Mich., a corporation of Delaware
No Drawing. Filed Nov. 12, 1959, Ser. No. 852,217
8 Claims. (Cl. 29—182.5)

The subject matter of this invention is an improved electrode, and method for making same, having particular utility in gaseous discharge tubes of the type shown, for example, in United States Patents 2,478,119 and 2,800,383, issued to R. H. Mitchel on August 2, 1949, and July 23, 1957, respectively.

The electrodes used in the electrical discharge tubes disclosed in the aforementioned patents consist of a dense mixture of iron and barium oxide, the barium being included because of its low work function which improves the electrical characteristics of the material. Prior to the present invention such electrodes were made by forming a mixture of powdered iron and either barium oxide, barium peroxide or barium oxalate, and then sintering the mixture at high temperatures. This method was not fully satisfactory principally because of its failure to produce a sufficiently uniform mixture of the barium in the iron. On a regular production basis as high as 50% of the electrodes produced by this method had to be discarded because of deficiencies in electrical characteristics due to nonuniformity of mixture. Even those electrodes meeting required standards were not productive of optimum electrical characteristics, this also because of the nonuniformity of dispersion of the barium.

It is an object of the present invention to provide an improved electrode for gaseous discharge tubes and the like. Another object is to provide an improved method for making electrodes. Still another object is the provision of a method for making electrodes of the type consisting of iron having a low work function material uniformly dispersed therein. More specifically, an object of the invention is the provision of an iron-barium electrode, and a method for making same, wherein optimum uniformity of dispersion of the barium in the iron is accomplished.

Briefly, these objects are realized in accordance with the invention by heating in a reducing atmosphere a mixed metal oxide wherein one of the metals present is iron, and then sintering the resultant product to form the electrode. Specifically, manufacture of an iron-barium electrode is accomplished in accordance with the invention by heating in a hydrogen atmosphere a pulverized mass of barium ferrite and then sintering the resultant product.

The above and other objects and advantages of the invention will appear more clearly from the following detailed description thereof made principally with reference to the manufacture of iron-barium electrodes.

As the starting material in the production of iron-barium electrodes, ordinary magnet-grade barium ferrite, which is commerically available from a number of sources, may be used. Where the electrodes to be made are desired for use in electrical discharge tubes such as shown in the aforementioned patents, we prefer barium ferrite containing iron oxide and barium oxide in a molar ratio of 6:1, i.e., $BaO \cdot 6Fe_2O_3$; however, it should be understood that barium ferrites containing the barium and iron oxides in other molar ratios may be employed if desired. As is well known in the art, barium ferrite is commonly made by firing a uniform mixture of $Fe_2O_3$ and barium carbonate or barium peroxide in the molar ratio desired. See, for example, United States Patent 2,762,777 Went et al., which describes such method in detail.

In accordance with the invention the barium ferrite after being pulverized to a powder is heated in a hydrogen atmosphere to about 1400° F. to 1600° F., preferably to about 1450° F. for two hours, during which step the iron oxide of the barium ferrite is reduced to iron. The powder resulting from this reducing operation can then be pressed into a powder compact of the desired shape and size at about 45,000 pounds per square inch, this preferably after having mixed a small amount, about 2%, of a suitable organic binder such as hydrogenated cottonseed oil with the powder to assist in the formation of a self-sustaining, dense compact which will withstand subsequent handling. The compact so formed is then heated for about one hour at 1600° F. in a hydrogen atmosphere, the initial heating preferably being at a relatively slow rate to accomplish removal of the organic binder without disturbing the compact. This firing operation effects a sintering of the powder compact and hence there results a relatively dense, sintered billet. To further reduce the porosity and increase the density of the billet it should then preferably be pressed at about 68,000 pounds per square inch and thereafter annealed in hydrogen at 2100° F. for one hour to complete the manufacture. The resulting electrode is highly advantageous, particularly in that there is maximum uniformity of dispersion of the barium in the iron matrix. The exact temperatures and times of heating and the pressures recited above are not critical though they are advantageous in providing optimum results in manufacturing electrodes from ferrites.

The exact composition of the finished iron-barium electrode is not known though it has been found that the iron is present in its metallic form as alpha-iron. The evidence is not clear as to the exact form in which the barium is present in the finished product; indications are that it is not in the form of metallic barium. Hence it will be clear that the use herein of the term "iron-barium electrode" should not be taken to indicate that the barium need be or will be present in the electrode in its elemental form. Rather, the term is used to mean an iron base electrode containing barium in some form.

If desired, mixed oxides other than barium ferrite may be used to produce electrodes in accordance with the invention. For example, other alkaline earth metal ferrites such as strontium ferrite or calcium ferrite may be used as starting materials to produce iron-strontium or iron-calcium electrodes. Strontium and calcium are similar to barium in that they have relatively low work functions and hence are useful in electrodes.

It will be understood that while the invention has been described specifically with reference to a particular embodiment thereof, changes and modifications may be made, all within the full and intended scope of the claims which follow.

We claim:
1. A method for making an electrode comprising the steps of heating in a hydrogen atmosphere an alkaline earth metal ferrite in powder form to thereby reduce the iron oxide in said ferrite to iron, and then compacting and sintering the resultant product to form a dense electrode body.
2. In a method for forming an electrode, the steps of heating in a hydrogen atmosphere a pulverized mass of barium ferrite to thereby reduce the iron oxide in said barium ferrite to iron, then pressing and sintering the resultant product.
3. A method for forming an electrode comprising the steps of heating to about 1400° F. to 1600° F. in a hydrogen atmosphere a pulverized mass of barium ferrite to thereby reduce the iron oxide in said barium ferrite to iron, pressing the resultant product to form a self- sustaining compact, heating said compact in a hydrogen atmosphere to form a sintered billet, pressing said billet to increase the density thereof and then annealing the pressed billet.

4. A method for forming an electrode comprising the steps of heating to about 1450° F. in a hydrogen atmosphere a pulverized mass of barium ferrite, pressing the resultant product at about 45,000 pounds per square inch to form a self-sustaining compact, heating said compact to about 1600° F. in a hydrogen atmosphere to form a sintered billet, pressing said billet at about 68,000 pounds per square inch and then annealing the pressed billet in a hydrogen atmosphere at about 2100° F.

5. An electrode for an electrical discharge device made by the steps of heating in a hydrogen atmosphere a pulverized mass of barium ferrite containing iron oxide and barium oxide in a molar ratio of about 6:1 to thereby reduce the iron oxide in said barium ferrite to iron, and then compacting and sintering the resultant product to form the electrode.

6. In a method for forming an electrode, the steps of heating in a hydrogen atmosphere a pulverized mass of an alkaline earth metal ferrite containing iron oxide and an alkaline earth metal oxide in a molar ratio of about 6:1 to thereby reduce the iron oxide in said alkaline earth metal ferrite to iron, pressing the resulting product to form a self-sustaining compact, and heating said compact in a hydrogen atmosphere to form a sintered billet.

7. A method as claimed in claim 3 wherein said barium ferrite contains iron oxide and barium oxide in a molar ratio of about 6:1.

8. A method as claimed in claim 4 wherein said barium ferrite contains iron oxide and barium oxide in a molar ratio of about 6:1.

References Cited in the file of this patent

UNITED STATES PATENTS

| | | |
|---|---|---|
| 1,883,898 | Halliwell | Oct. 15, 1932 |
| 2,706,682 | Barnard et al. | Aug. 19, 1955 |
| 2,893,859 | Triffleman | July 7, 1959 |
| 3,024,110 | Funkhouser et al. | Mar. 6, 1962 |